United States Patent
Park et al.

(10) Patent No.: US 7,990,966 B2
(45) Date of Patent: Aug. 2, 2011

(54) APPARATUS FOR CHANGING MAC ADDRESS TO IDENTIFY SUBSCRIBER AND METHOD THEREOF

(75) Inventors: Dae-Geun Park, Daejon (KR);
Bhum-Cheol Lee, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 859 days.

(21) Appl. No.: 11/302,604

(22) Filed: Dec. 13, 2005

(65) Prior Publication Data

US 2006/0126622 A1 Jun. 15, 2006

(30) Foreign Application Priority Data

Dec. 13, 2004 (KR) .................. 10-2004-0105073
Apr. 15, 2005 (KR) .................. 10-2005-0031258

(51) Int. Cl.
*H04L 12/28* (2006.01)
*H04L 12/56* (2006.01)
*H04J 3/24* (2006.01)
*G06F 15/173* (2006.01)

(52) U.S. Cl. ......... 370/392; 370/474; 370/475; 709/242
(58) Field of Classification Search .............. 370/389
See application file for complete search history.

(56) References Cited

U.S. PATENT DOCUMENTS

| | | | |
|---|---|---|---|
| 6,256,314 B1 * | 7/2001 | Rodrig et al. ............ | 370/401 |
| 6,640,251 B1 * | 10/2003 | Wiget et al. ............. | 709/238 |
| 6,880,089 B1 * | 4/2005 | Bommareddy et al. .... | 726/11 |
| 7,102,996 B1 * | 9/2006 | Amdahl et al. ........... | 370/230 |
| 2001/0046229 A1 * | 11/2001 | Clear et al. .............. | 370/389 |
| 2002/0009090 A1 * | 1/2002 | Kalkunte et al. ......... | 370/401 |
| 2002/0016858 A1 * | 2/2002 | Sawada et al. ........... | 709/238 |
| 2003/0145108 A1 * | 7/2003 | Joseph et al. ............ | 709/239 |
| 2003/0210706 A1 * | 11/2003 | Chang et al. ............. | 370/466 |
| 2003/0229809 A1 * | 12/2003 | Wexler et al. ............ | 713/201 |
| 2004/0030804 A1 * | 2/2004 | Wiget et al. ............. | 709/245 |
| 2004/0184454 A1 * | 9/2004 | Shankar et al. .......... | 370/390 |
| 2005/0135422 A1 * | 6/2005 | Yeh .......................... | 370/474 |

FOREIGN PATENT DOCUMENTS

| | | |
|---|---|---|
| JP | 2000-155736 | 6/2000 |
| KR | 1020000054473 A | 9/2000 |
| KR | 1020020035225 A | 5/2002 |
| KR | 1020030084793 A | 11/2003 |
| KR | 1020050009914 A | 1/2005 |

* cited by examiner

*Primary Examiner* — Andrew Chriss
(74) *Attorney, Agent, or Firm* — Blakely, Sokoloff, Taylor & Zafman LLP

(57) ABSTRACT

Provided is an apparatus for changing Media Access Control (MAC) address, which is a conventional subscriber hardware identification address for identifying each subscriber, and a method thereof. The MAC address changing apparatus includes a frame receiving block for determining whether to change a source MAC address; a switch controlling block for controlling a switch; a change MAC address generating block for changing the source MAC address of the received frame; a change MAC address storing block for storing information of the change MAC address and the source MAC address corresponding thereto; a MAC address forwarding and lookup block for extracting output port information; a MAC address replacing block for forming an output frame by replacing the source MAC address; a MAC address storing block for storing a MAC address; and a frame transmitting block for transmitting the output frame.

6 Claims, 9 Drawing Sheets

FIG. 4A

| CHANGE MAC ADDRESS | SOURCE MAC ADDRESS |
|---|---|
| ⋮ | ⋮ |

FIG. 4B

| SOURCE MAC ADDRESS | PORT NUMBER | AGING | . . . . . . |
|---|---|---|---|
| ⋮ | ⋮ | ⋮ | ⋮ |

APPARATUS FOR CHANGING MAC ADDRESS TO IDENTIFY SUBSCRIBER AND METHOD THEREOF

FIELD OF THE INVENTION

The present invention relates to an apparatus for changing a Media Access Control (MAC) address applied to a subscriber network environment including multi-step Ethernet switches and a method thereof; and, more particularly, to a MAC address changing apparatus for changing a MAC address, which is an address conventionally used to identify subscriber hardware to identify each subscriber. The subscriber identification is required to secure a predetermined portion of a band to each subscriber and provide a differentiated service for each subscriber, and a method thereof.

DESCRIPTION OF RELATED ART

Since a general Ethernet switch has a simpler structure in comparison with the structure of an Internet Protocol (IP) switch or a router and the Ethernet switch can reduce the cost for equipment and it can be operated and maintained easily, the use of the Ethernet switch is rapidly increasing particularly in a subscriber network. The Ethernet switch can have a simple structure by performing switching in consideration of only a Media Access Control (MAC) address, which is a hardware address, when switching data of an inputted subscriber. That is, subscriber identification is carried out in the Ethernet switch based on the MAC address of a subscriber node which is transmitted through a port.

The subscriber network has a structure transmitting traffic from many subscribers to an edge network through an upward link. Generally, the capacity of the upward link is much less than the summation of usable bands which are allotted to subscribers. Therefore, if specific users possess a band too much, a service cannot be provided to a majority of users properly. In particular, in case of a network including pay users, unbalance of the band usage can cause a big problem in the quality of service.

The kinds of traffic using a subscriber network include a real-time speech and a real-time video as well as general data, which are not required in real-time. A band needs to be secured to a certain extent to satisfy the quality of a service including the traffic.

With a basic Ethernet switch simply performing switching into a MAC address of the subscriber in the aforementioned subscriber network, it is not possible to secure a band of each subscriber for real-time services.

Some conventional Ethernet switches have made an attempt to effectively control an entire band by adding a band control function, which can control a traffic flow, to the Ethernet switch in order to solve the problem. Herein, it is possible to control the band, in certain measure, within a single switch, but it is not possible to control the band equally with respect to all subscribers in case that the Ethernet switches are connected in multiple steps.

Meanwhile, the band is controlled in the IP switch or a router according to the subscriber or the traffic by adding a characteristic to each traffic individually. However, it is difficult to apply the method to the subscriber network due to high equipment price, difficult operation and maintenance, and limited performance.

SUMMARY OF THE INVENTION

As described above, an upper switch having an upward link, e.g., a root switch, connected through an edge network, differently from the conventional method, should be able to identify all subscribers when a service securing a certain portion a band to each subscriber or a subscriber-differentiated service is provided in a subscriber network environment including a paying service subscriber.

It is, therefore, an object of the present invention to provide a Media Access Control (MAC) address changing apparatus for changing a MAC address to identify a subscriber, which is required to maintain equality among subscribers and provide a service differentiated for each subscriber, and a method thereof.

That is, the object of the present invention is to provide a MAC address changing apparatus capable of identifying all subscribers connected to lower switches in an upper switch through a change of the MAC address, and a method thereof.

Other objects and advantages of the invention will be understood by the following description and become more apparent from the embodiments in accordance with the present invention, which is set forth hereinafter. It will be also apparent that objects and aspects of the invention can be embodied easily by the means defined in the claims and combinations thereof.

In accordance with an aspect of the present invention, there is provided a Media Access Control (MAC) address changing apparatus for identifying a subscriber, including: a frame receiving block for determining whether to change a source MAC address of a received frame; a switch controlling block for controlling a switch; a change MAC address generating block for changing the source MAC address of the received frame, which is determined to be changed in the frame receiving block, into a new MAC address; a change MAC address storing block for storing the new MAC address generated in the change MAC address generating block, which is referred to as a change MAC address hereinafter, and the source MAC address corresponding to the change MAC address; a MAC address forwarding and lookup block for extracting output port information by performing a forwarding and lookup function with respect to the source MAC address of the received frame; a MAC address replacing block for forming an output frame by replacing the source MAC address according to the output port information from the MAC address forwarding and lookup block; a MAC address storing block for storing the MAC address; and a frame transmitting block for transmitting the output frame.

In accordance with another aspect of the present invention, there is provided a MAC address change method for subscriber identification, including the steps of: a) determining whether to change a source MAC address of a received frame based on a source MAC address value; b) changing the source MAC address with a new MAC address according to determination that the source MAC address should be changed; c) performing the MAC address forwarding and lookup based on the source MAC address of the received frame; d) generating an output frame by replacing the source MAC address according to an extracted output port information; and e) transmitting the output frame through a designated output port.

BRIEF DESCRIPTION OF THE DRAWINGS

The above and other objects and features of the present invention will become apparent from the following description of the preferred embodiments given in conjunction with the accompanying drawings, in which:

FIG. 1 is a diagram showing a subscriber network to which a Media Access Control (MAC) address changing apparatus and method for subscriber identification are applied to;

FIG. 4A is a diagram showing a change MAC address table recording change information of a source MAC address in the MAC address changing apparatus and method in accordance with an embodiment of the present invention;

FIG. 4B is a block diagram showing a MAC address table used for lookup and learning in the MAC address changing apparatus and method in accordance with an embodiment of the present invention;

DETAILED DESCRIPTION OF THE INVENTION

Other objects and aspects of the invention will become apparent from the following description of the embodiments with reference to the accompanying drawings, which is set forth hereinafter. Thus, those skilled in the art that the present invention is included can embody the technological concept and scope of the invention easily. In addition, if it is considered that detailed description on the prior art may blur the point of the present invention, the detailed description will not be provided herein. The preferred embodiments of the present invention will be described in detail hereinafter with reference to the attached drawings.

Figure 1:
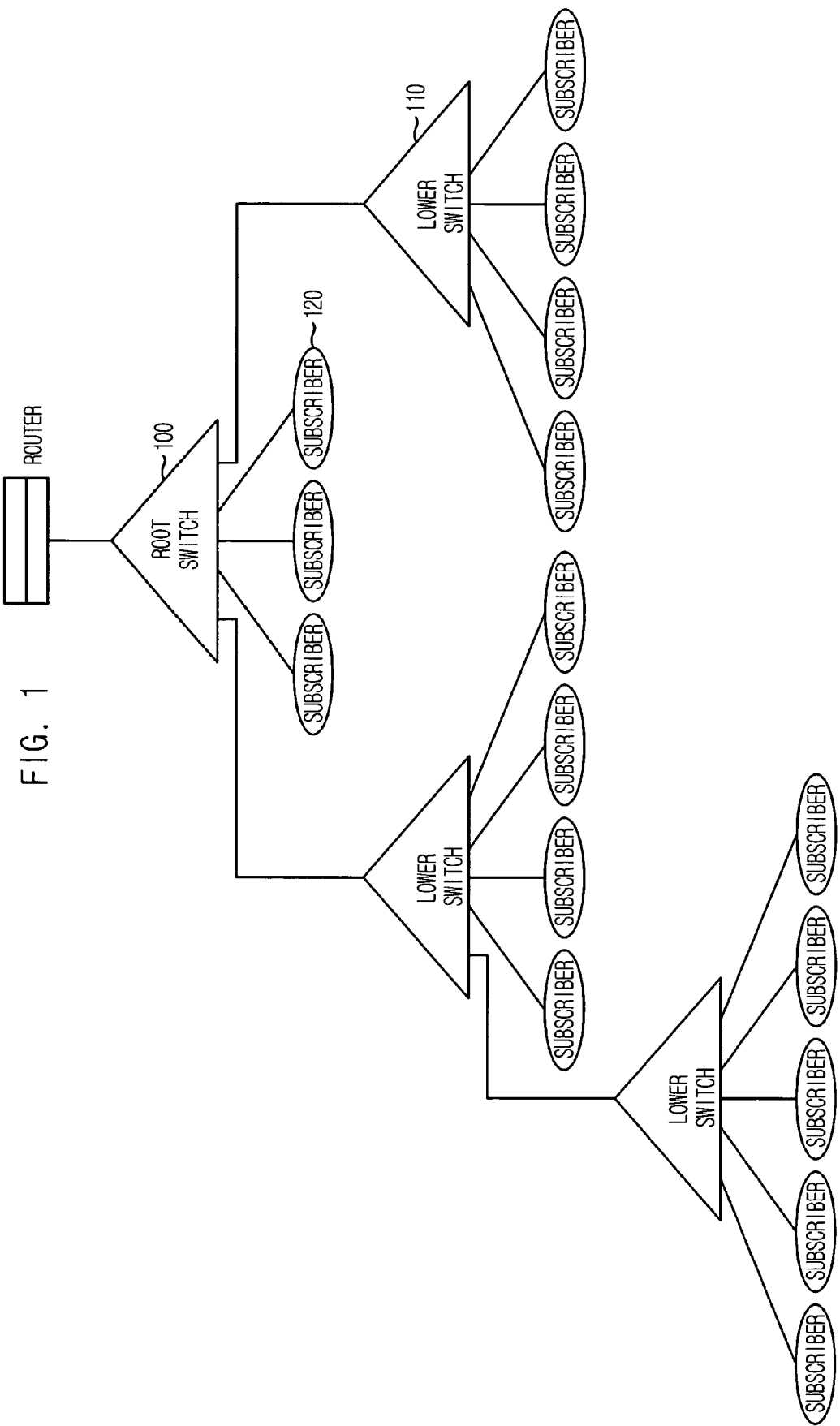

FIG. 1 is a diagram showing a subscriber network to which a Media Access Control (MAC) address changing apparatus and method for subscriber identification are applied to.

As shown in FIG. 1, the MAC address changing apparatus of the present invention applied to an Ethernet subscriber network environment including a multi-step Ethernet switch will be described hereinafter, but the present invention is not limited to the embodiment. Herein, the MAC address changing apparatus and method of the present invention are applied to each Ethernet switch of the Ethernet subscriber network including the multi-step Ethernet switch.

As shown, the subscriber network includes a root switch 100 connected to a router, and a plurality of lower switches connected to the root switch 100 in multiple steps. Also, each lower switch 110 may include other lower switches or subscribers 120.

In the subscriber network environment including a paying service subscriber, all subscribers connected to relevant lower switches 110 are identified by the root switch 100 having an upward link connected through the edge network by changing the MAC address, thereby securing a predetermined portion of a band to each subscriber or providing a differentiated service for each subscriber, which is different from the conventional method.

Figure 2:
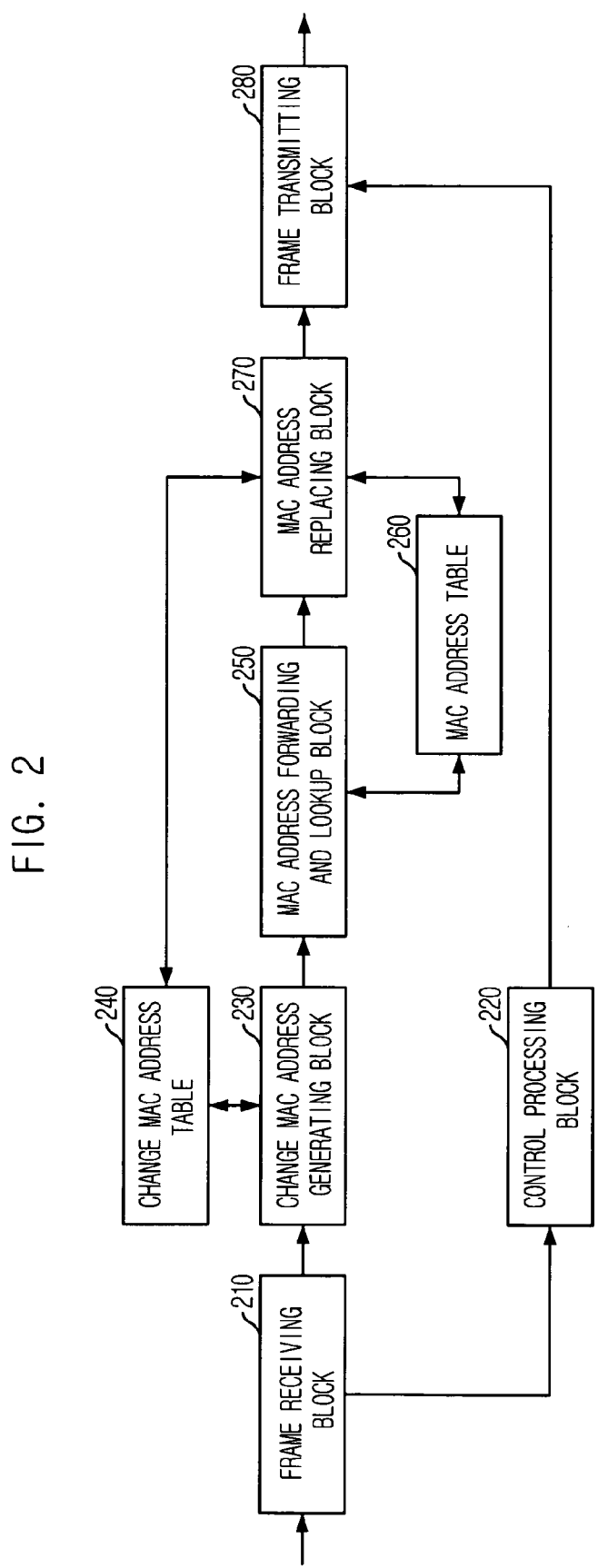
FIG. 2 is a block diagram showing the MAC address changing apparatus for subscriber identification in accordance with an embodiment of the present invention.

FIG. 2 is a block diagram showing the MAC address changing apparatus for subscriber identification in accordance with an embodiment of the present invention.

As shown in FIG. 2, the MAC address changing apparatus for subscriber identification suggested in the present invention includes a frame receiving block 210, a control processing block 220, a change MAC address generating block 230, a change MAC address table 240, a MAC address forwarding and lookup block 250, a MAC address table 260, a MAC address replacing block 270 and a frame transmitting block 280.

The frame receiving block 210 receives a frame through a switch port and determines whether to change the source MAC address of the frame. The control processing block 220 controls a general hardware function of the switch and performs a software function of the switch. The change MAC address generating block 230 changes the source MAC address of the received frame, which is determined to be changed in the frame receiving block 210, into a new MAC address. The change MAC address table 240 correspondingly stores the new MAC address change MAC address, which will be referred to as a change MAC address, hereinafter, corresponding to the source MAC address. The MAC address forwarding and lookup block 250 extracts output port information by performing a forwarding and a lookup function with respect to the source MAC address of the received frame. The MAC address replacing block 270 forms an output frame by replacing the source MAC address according to the output port information from the MAC address forwarding and lookup block 250. The MAC address table 260 stores the MAC address, which is used by the MAC address forwarding and lookup block 250 and the MAC address replacing block 270. The frame transmitting block 280 substantially transmits the output frame.

Each component will be described in detail hereinafter.

The frame receiving block 210 receives the frame received through the Ethernet switch port, generates a signal directing to change or maintain the source MAC address of the received Ethernet frame by analyzing a connection structure of the subscriber, i.e., by using the MAC address of the input frame, transmits the signal to the change MAC address generating block 230, and transmits the frame having a specific MAC address to the control processor 220 so that the frame can be transmitted to the frame transmitting block 280.

The change MAC address generating block 230 changes the source MAC address of the received frame by using header information of the received frame upon a source MAC address change directing signal transmitted from the frame receiving block 210, generates the change MAC address, and correspondingly stores the generated change MAC address and the source MAC address in the change MAC address table 240 (see FIG. 4A). The change MAC address generating block 230 maintains the source MAC address of the input frame according to a source MAC address maintenance directing signal, and transmits the source MAC address to the MAC address forwarding and lookup block 250. The maintenance function can be realized by using diverse methods such as bypass.

The MAC address forwarding and lookup block 250 performs a MAC address forwarding and lookup function by using MAC address information transmitted from the change MAC address generating block 230, and extracts the output port information by generating the process signal with respect to the source or the destination MAC address within an Address Resolution Protocol (ARP) packet. Herein, the MAC address forwarding and lookup block 250 uses the MAC address table 260, which is shown in FIG. 4B.

The MAC address replacing block 270 forms the Ethernet frame to be outputted by replacing the source MAC address of the frame based on the output port information transmitted from the MAC address forwarding and lookup block 250. The output port information reflects the result obtained by performing in all the above procedures. Herein, the MAC address replacing block 270 uses the change MAC address table 240 and the MAC address table 260.

The frame transmitting block 280 transmits the Ethernet frame to be outputted, which is transmitted from the control processing block 220 or the MAC address replacing block 270, to the designated output port.

Figure 5:
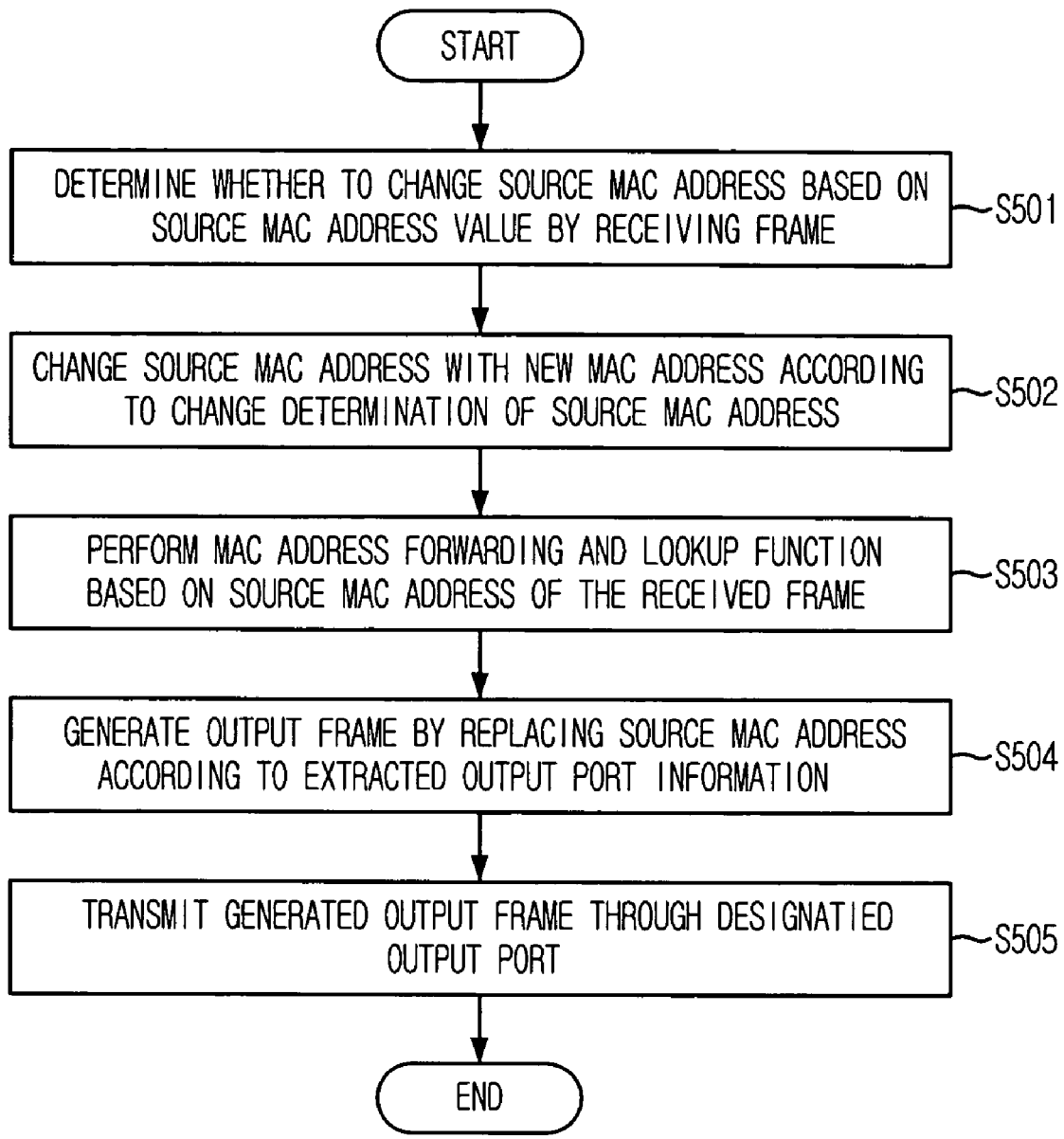
FIG. 5 is a flowchart showing a MAC address change method for subscriber identification in accordance with an embodiment of the present invention.

FIG. 5 is a flowchart showing a MAC address change method for subscriber identification in accordance with an embodiment of the present invention.

At step S501, it is determined whether to change the source MAC address of a frame in process based on a source MAC address value by receiving the Ethernet frame. That is, it is determined whether the frame is transmitted directly from the subscriber or via the Ethernet switch, based on the MAC address of the frame, which is inputted from the Ethernet switch port of the subscriber network and a pre-designated specific frame is separately transmitted to the control processing block 220, while the other frames are transmitted to the change MAC address generating block 230 by generating a signal directing to change or maintain the source MAC address. Herein, the change of the source MAC address is commanded with respect to the frame directly received from the subscriber, and the maintenance of the source MAC address is commanded with respect to the frame received via an Ethernet switch.

At step S502, the source MAC address is changed into a new MAC address according to the determination that the source MAC address is to be changed, and the change relationship is stored. That is, the source MAC address of the received frame is changed into the new MAC address based on a predetermined rule by using the header information of the received frame upon the signal directing the source MAC address change, the change MAC address is generated, and the change MAC address and the source MAC address information are correspondingly stored in the change MAC address table 240 (see FIG. 4). Meanwhile, upon receipt of the source MAC address of the received frame, the source MAC address of the received frame is maintained.

At step S503, the MAC address forwarding and lookup is performed based on the source MAC address of the received frame. That is, the MAC address forwarding and lookup function is performed based on the source MAC address that has gone through a change procedure, and the output port information is extracted by generating a signal for processing the MAC address of the source or the destination within the ARP packet.

At step S504, an output frame is generated by replacing the source MAC address according to the extracted output port information. That is, the Ethernet frame to be outputted is generated according to the output port information reflecting a result obtained by performing all the above procedures including a frame receiving procedure and a MAC address forwarding and lookup procedure.

At step S505, the generated output frame is outputted. That is, the generated Ethernet frame is actually transmitted to the designated output port.

Figure 6:
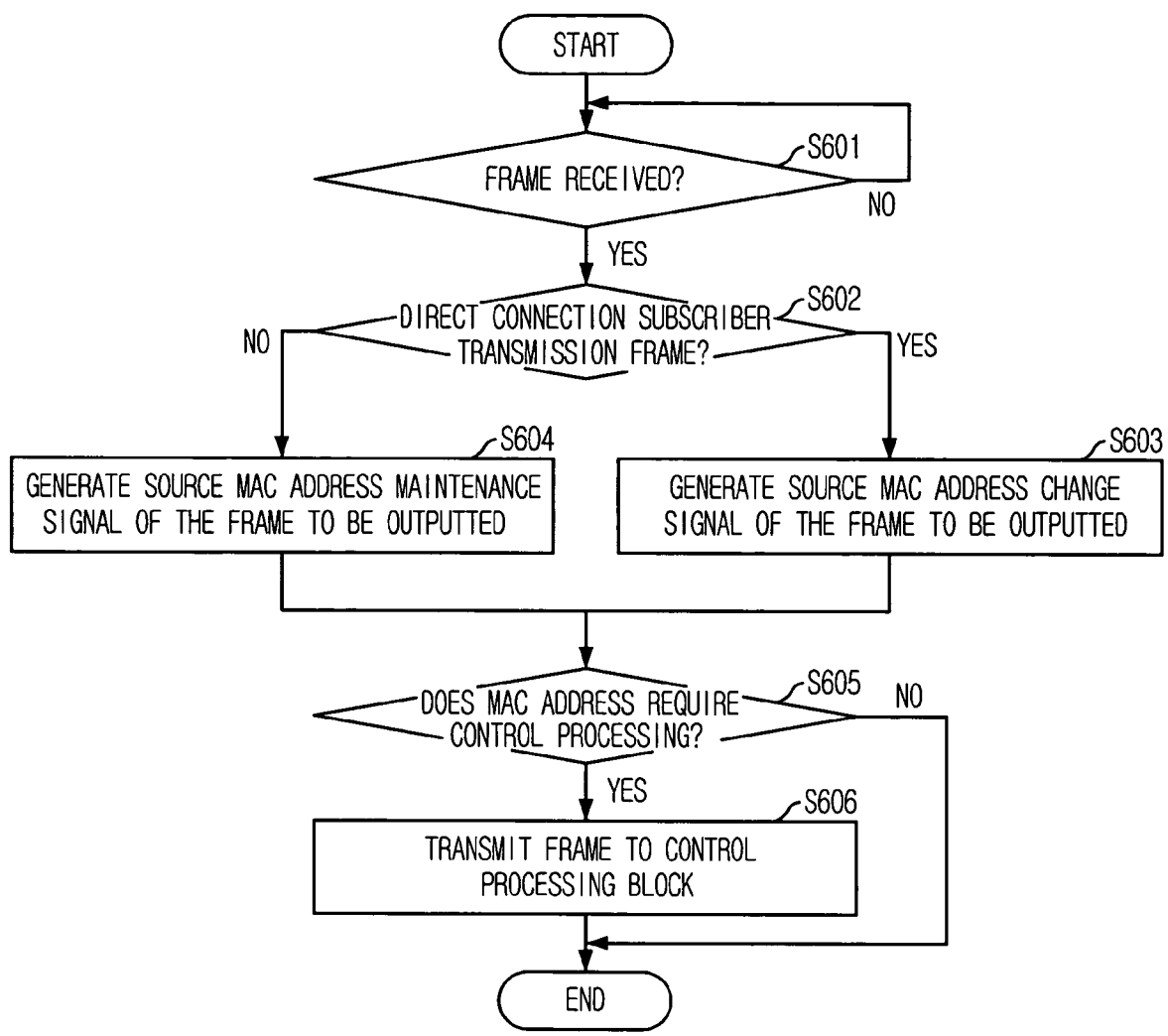
FIG. 6 is a flowchart illustrating a frame processing in a frame receiving block in accordance with an embodiment of the present invention.

FIG. 6 is a flowchart illustrating a frame processing in a frame receiving block in accordance with an embodiment of the present invention.

Generally, when power is supplied to each switch and an identification value of each switch, which is assigned in advance by an operator to identify the position of each switch, is identified, the basic initialization is completed.

At steps S601 and S602, after the initializing procedure of the switch is completed, the frame receiving block 210 determines whether the subscriber frame is directly connected to the switch port or inputted from the port connected to the switch based on whether a start field of the source MAC address of the received frame includes a change MAC identification value or not.

In the result of the step S602, if the received frame is transmitted from the subscriber directly connected to the port of the switch, the signal for changing the source MAC address part of the frame to be outputted is generated at step S603. If the received frame is transmitted from the subscriber connected via the switch, the signal for maintaining the inputted MAC address part is generated at step S604. In short, the signal for maintaining the source MAC address part of the frame to be outputted is generated.

At steps S605 and S606, if the frame is registered to require a process by the control processing block 220, the frame is transmitted to the control processing block 220.

Meanwhile, the control processing block 220 processes the frame transmitted from the frame receiving block 210, and performs a general function such as controlling the function of the general Ethernet switch and managing a condition of the switch.

Figure 7:
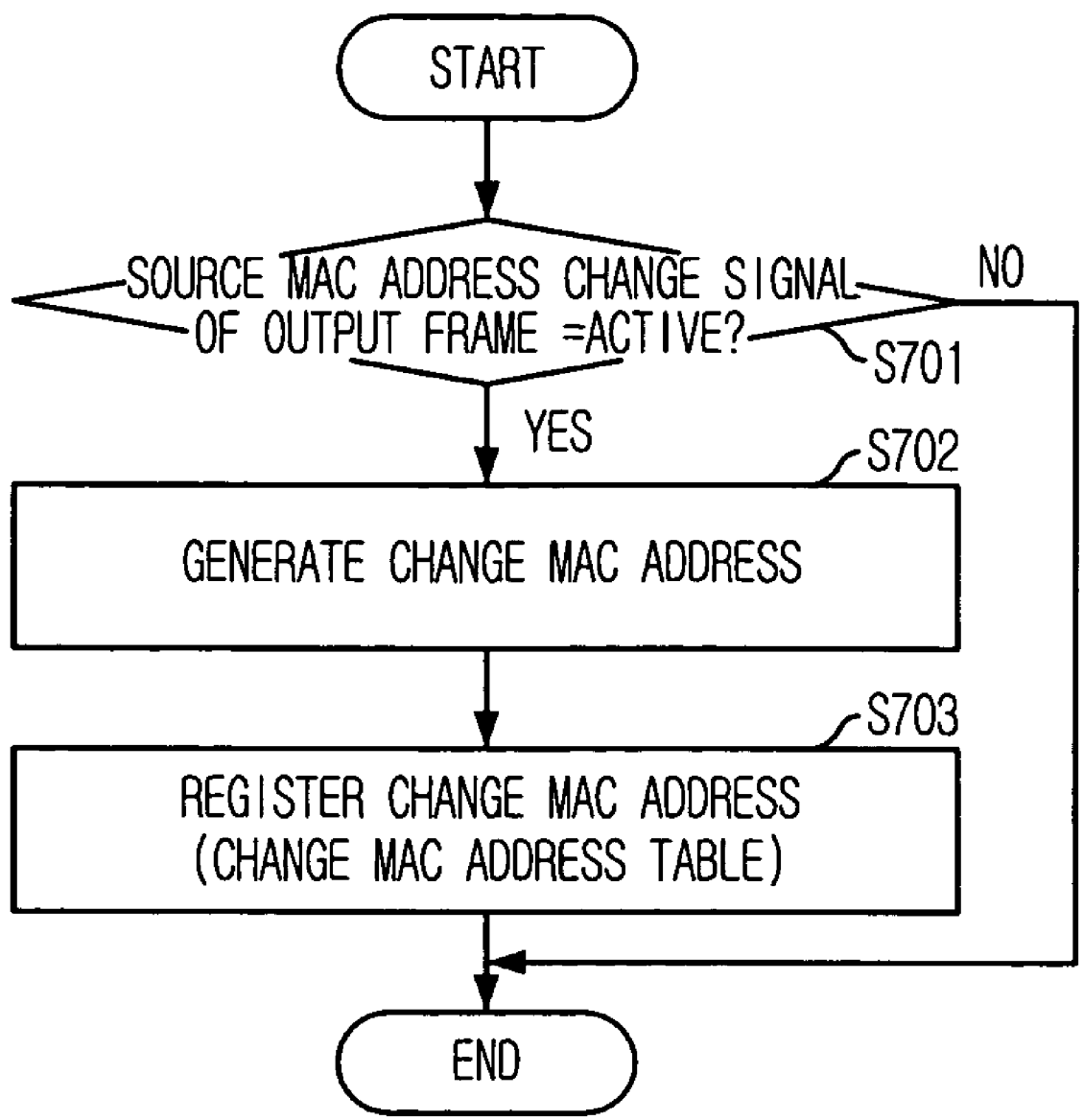
FIG. 7 is a flowchart illustrating a MAC address generating and registering procedure in a change MAC address generating block in accordance with an embodiment of the present invention.

FIG. 7 is a flowchart illustrating a MAC address generating and registering procedure in a change MAC address generating block in accordance with an embodiment of the present invention.

At step S701, the change MAC address generating block 230 changes the source MAC address of the received frame into a new MAC address or maintains the source MAC address according to the MAC address change/maintenance signal generation result of the frame receiving block 210.

Figure 3:
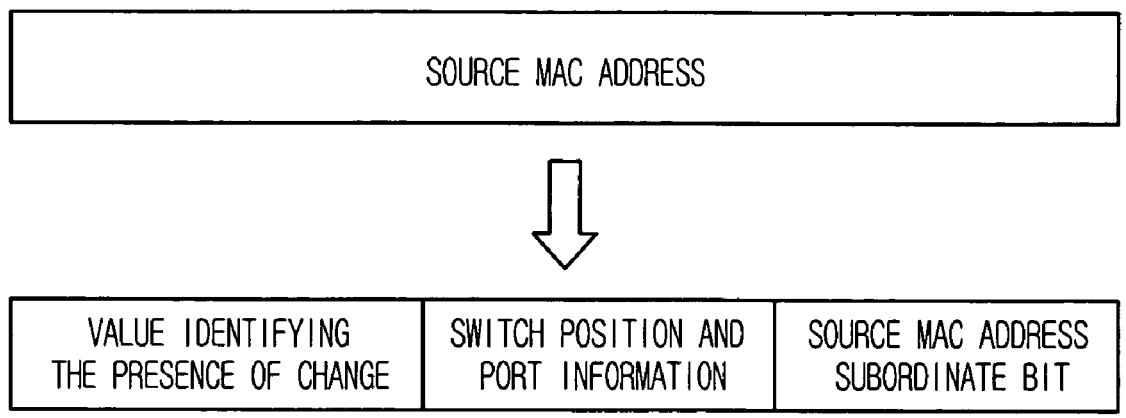
FIG. 3 is a diagram showing a structure of a change MAC address applied to the MAC address changing apparatus and method for subscriber identification in accordance with an embodiment of the present invention.

If the MAC address change is unnecessary, the MAC address inputted without any process is maintained. Otherwise, a new change MAC address is generated by changing the source MAC address at step S702. As shown in FIG. 3, the newly generated change MAC address includes a change MAC identifier, which is a value identifying the presence of change, a switch identification value and a frame input port value, which are a switch position and port information, and a MAC subscriber identification value of the received frame, which is a source MAC address subordinate bit.

At step S703, the newly generated change MAC address is correspondingly stored as an entry with an original source MAC address of the received frame in the change MAC address table 240.

Figure 8:
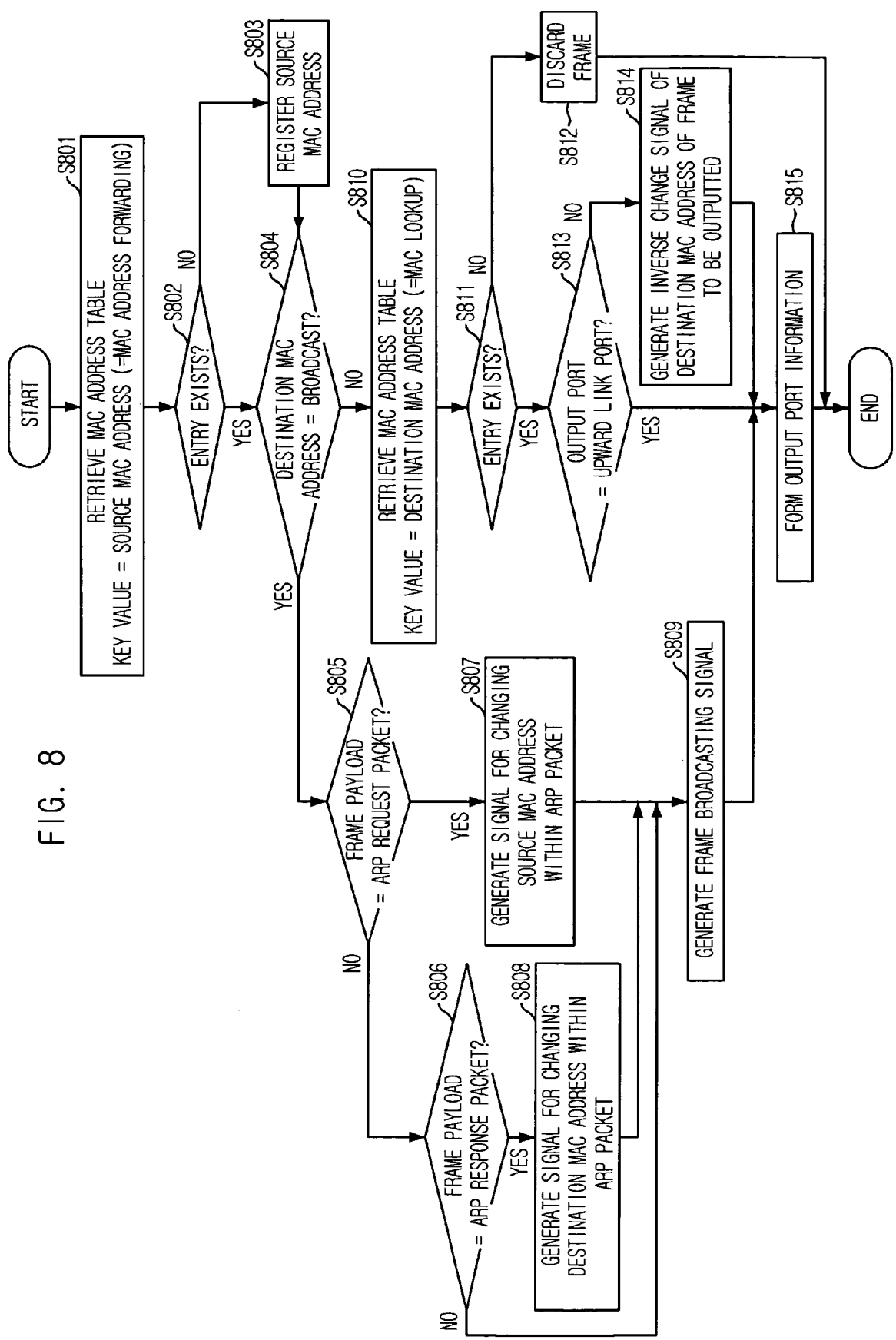
FIG. 8 is a flowchart illustrating the process of a MAC address forwarding and lookup block in accordance with an embodiment of the present invention.

FIG. 8 is a flowchart illustrating the processing of a MAC address forwarding and lookup block in accordance with an embodiment of the present invention.

The MAC address forwarding and lookup block 250 performs a forwarding function with respect to the source MAC address through the change MAC address generating block 230, and a MAC address lookup function for retrieving an entry corresponding to the destination MAC address by retrieving the MAC address table 260.

The MAC forwarding function checks at step S802 whether the source MAC address is registered by retrieving whether the value of the source MAC address in the MAC address table 260 at step S801. If the source MAC address is registered, the logic flow goes directly to a step S804. Otherwise, the source MAC address and the port information that the frame including the source MAC address is inputted are registered together in the MAC address table 260 at step S803, and the logic flow goes to the step S804.

At the step S804, the MAC lookup function is performed to identify whether the payload of the received frame is an ARP packet by checking whether the destination address of the received frame is a broadcast type.

In the step S804, if the payload of the received frame is an ARP packet, at the steps S805 and S806, it is checked whether the payload is an ARP request packet or an ARP response packet.

In the steps S805 and S806, if the payload is an ARP request packet, a signal for changing the source MAC address field within the ARP packet into the changed MAC address is generated at step S807. However, the MAC address of the field is not changed by the generation of the MAC address change signal. If the change signal with respect to the source MAC address field within the ARP packet is generated, a broadcasting signal of the frame is generated at step S809, the logic flow goes to a step S815.

In the steps S805 and S806, if the payload is the ARP response packet, a change signal for changing the destination MAC address field within the ARP packet into the changed MAC address is generated at step S808. Then, a broadcasting signal of the frame is generated at step S809, the logic flow goes to the step S815.

In the steps S805 and S806, if the payload of a broadcast frame in process is not an ARP request packet or an ARP response packet, a signal for general frame broadcasting is generated at the step S809, the logic flow goes to the step S815.

In the step S804, if the payload is not a broadcast frame, it is checked at step S811 whether an entry corresponding to a key value exists by performing an output port lookup function for retrieving the MAC address table 260 with the destination MAC address of the frame as a key value, at step S810.

In the steps S810 and S811, if an entry corresponding to a key value does not exist, the frame in process is discarded at step S812. Otherwise, the port value designated by the entry is used as the output port at step S813. Herein, if the output port is connected to the upward link port, the output port information is instantly formed at step S815. On the contrary, if the output port is connected to the subscriber port, i.e., a lower link port, instead of the upward link port, a signal inversely changing the destination MAC address of the frame to be outputted is generated at step S814, and the output port information is formed at the step S815.

Figure 9:
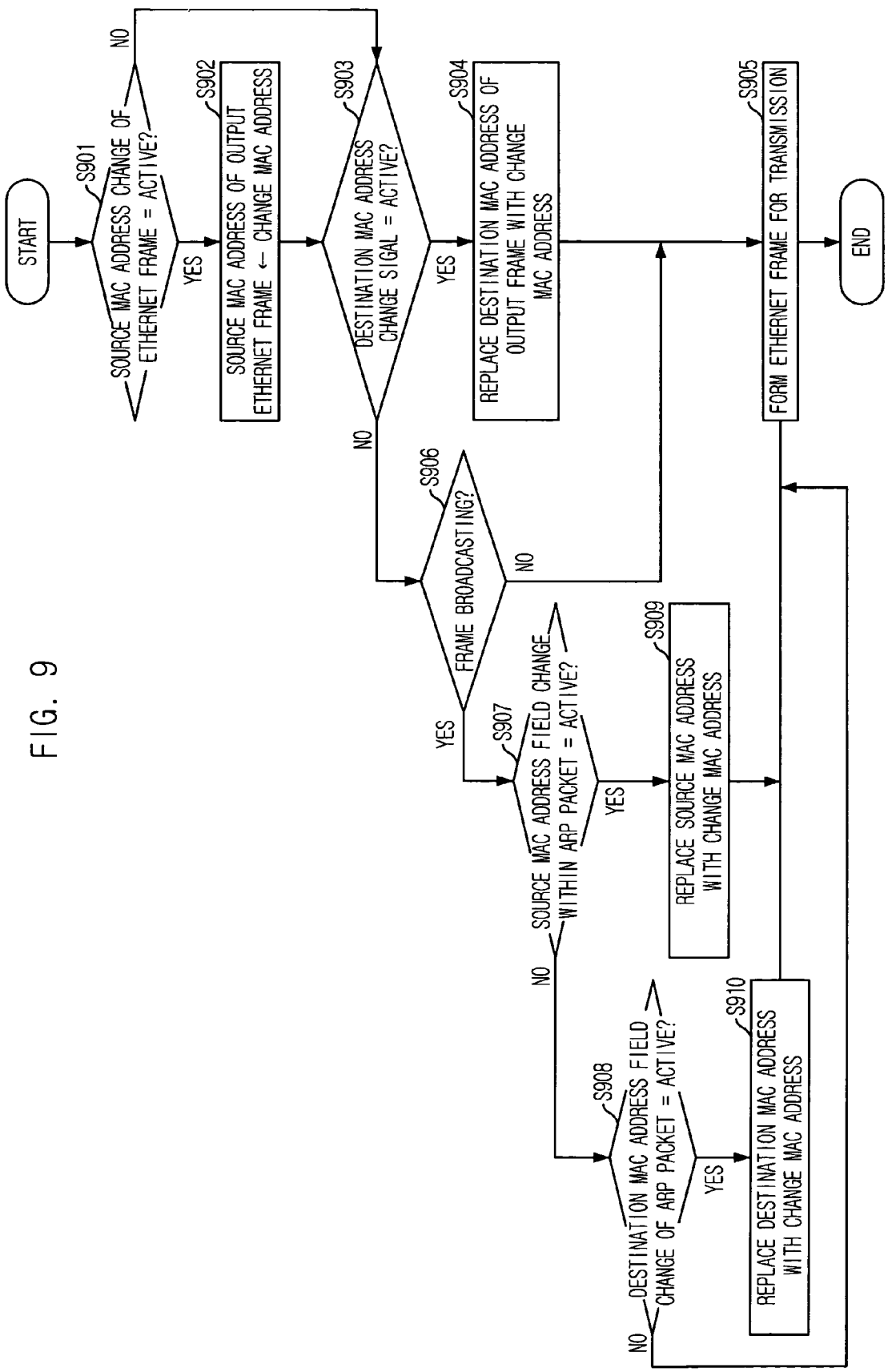
FIG. 9 is a flowchart illustrating a procedure forming a frame for outputting in a MAC address replacing block in accordance with an embodiment of the present invention.

FIG. 9 is a flowchart illustrating a procedure forming a frame for outputting in a MAC address replacing block in accordance with an embodiment of the present invention.

At step S901, the MAC address replacing block 270 determines whether to replace the source MAC address of an Ethernet frame to be outputted into a change MAC address by using the change signal generation result of the MAC address field in the change MAC address generating block 230 and MAC address forwarding and lookup block 250. If the source MAC address change signal of the Ethernet frame in process is activated in the change MAC address generating block 230, the source MAC address field value of the output Ethernet frame is replaced with a change MAC address value corresponding thereto at step S902, the logic flow goes to a step S903. However, if the MAC address change signal is not activated, the source MAC address field of the Ethernet frame to be outputted is maintained, and the logic flow goes to a step S903.

If the destination MAC address change signal of the frame in process is activated at the step S903, an Ethernet frame for transmitting is formed at step S905 by replacing the destination MAC address field value of the frame to be outputted into a corresponding change MAC address value at step S904. Herein, the MAC address to be changed is brought by retrieving the change MAC address table 240 having the destination address of the inputted MAC address as a key value.

If the source and destination MAC address change signal of the Ethernet frame are inactive at the step S903 and they are not broadcasting frames at step S906, the Ethernet frame for transmission is formed at the step S905.

If the source and destination MAC address change signals of the Ethernet frame are inactive and they are broadcasting frames at the step S906, it is checked at steps S907 and S908 whether the source or destination MAC address change signal of the ARP packet is active. If the source MAC address change signal of the ARP packet is active, a value corresponding to the source MAC address of a corresponding field is replaced with a corresponding change MAC address at step S909, and the logic goes to the step S905. If the destination MAC address field change signal of the ARP packet is active, the destination MAC address value of the field is replaced with a corresponding change MAC address at step S910, and the logic goes to the step S905. If the change signal with respect to the source or destination MAC address change signal within the ARP packet is inactive, the Ethernet packet frame to be outputted is formed without change at the step S905.

Meanwhile, the frame transmitting block 280 transmits the Ethernet frame generated through the MAC address replacing block 270 to a corresponding output port.

As described above, the present invention can be embodied as a program and stored in a computer-readable recording medium, such as CD-ROM, RAM, ROM, a floppy disk, a hard disk and a magneto-optical disk. Since the process can be easily implemented by those skilled in the art, further description will not be provided herein.

The present invention makes it possible for each switch of a subscriber network to grasp the position information of all subscribers going through the switch, and identify subscribers connected to each port by using the position information of the subscriber, thereby recognizing a registration condition of the subscriber of each port.

Also, the present invention can provide a service among subscribers by allotting different bands to each port based on the information, and equally dividing the assigned band to subscriber registered in the port, or the present invention can provide differentiated service to the subscribers by differently dividing the band.

The present application contains subject matter related to Korean patent application Nos. 2004-0105073 and 2005-031258, filed with the Korean Intellectual Property Office on Dec. 13, 2004 and Apr. 15, 2005, respectively, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A Media Access Control (MAC) address change method for subscriber identification, comprising the steps of:
   a) determining whether to change a source MAC address of a received frame based on a connection structure of a subscriber determined by a source MAC address value;

b) changing the source MAC address with a new MAC address according to the determination that the source MAC address should be changed, wherein the new MAC address includes a change MAC identifier, a switch position identification value, a frame input port value, and a MAC subscriber identification value of the received frame;

c) performing the MAC address forwarding and lookup based on the source MAC address of the received frame;

d) generating an output frame by replacing the source MAC address according to an extracted output port information; and e) transmitting the output frame through a designated output port.

2. The method as recited in claim 1, wherein, in the step a), whether the frame is transmitted directly from the subscriber through the MAC address of the received frame inputted from the switch port, or transmitted via a switch is determined and a pre-designated specific frame is transmitted separately while other frames are transmitted by generating the signal directing to change or maintain the source MAC address.

3. The method as recited in claim 2, wherein, in the step a), the source MAC address of the frame directly received from the subscriber is directed to be changed, and the source MAC address of the frame received via an Ethernet switch is directed to be maintained.

4. The method as recited in claim 2, wherein, in the step b), a new MAC address is generated by changing the source MAC address of the received frame into a new MAC address based on a predetermined rule by using the header information of the received frame upon a signal directing to change the source MAC address, and the change MAC address and the source MAC address corresponding thereto are stored in a change MAC address table correspondingly, and the source MAC address of the received frame is maintained upon the signal directing to maintain the source MAC address.

5. The method as recited in claim 4, wherein, in the step c), the MAC address forwarding and lookup are performed based on the source MAC address obtained from the step b), and output port information is extracted by generating a signal for processing the source or destination MAC address within an address resolution protocol (ARP) packet.

6. The method as recited in claim 5, wherein in the step d), an Ethernet frame to be outputted is generated according to the output port information reflecting a result obtained by performing the entire steps.

* * * * *